3,558,531
PROCESS FOR CLOSED-CELL RIGID
POLYURETHANE FOAMS
Ival O. Salyer, Dayton, and Robert T. Jefferson, Carrollton, Ohio, assignors, by mesne assignments, to the United States of America as represented by the United States Atomic Energy Commission
No Drawing. Filed Mar. 28, 1968, Ser. No. 716,992
Int. Cl. C08g 41/04
U.S. Cl. 260—2.5    5 Claims

ABSTRACT OF THE DISCLOSURE

Isotropic low-density closed-cell rigid polyurethane foams are prepared from polyether polyols and polyisocyanates, using a cyclopentane-acetone mixture as a pneumatogen and finely-powdered polyethylene as a nucleating agent.

---

The invention described herein was made in the course of, or under, Contract W–7405–ENG–48 with the United States Atomic Energy Commission.

BACKGROUND OF THE INVENTION

This invention pertains to porous or cellular synthetic resinous materials and more particularly to improvements in the manufacture of polyurethane foams of closed-cell rigid structure.

Rigid polyurethane foams are well-established commercial products with production reported in millions of pounds per year in the United States (see Ferrigno, "Rigid Plastic Foams," Reinhold, 1963; Saunders and Frisch, "Polyurethanes, Chemistry and Technology I Chemistry," High Polymers vol. XVI, part I, Interscience, 1962). They are useful for thermal insulation, acoustical absorbers, packing materials, floats, structural fillers, etc. The production of foams from polyether polyols and organic polyisocyanates in the presence of a blowing agent has been previously disclosed, e.g. by E. F. Cox in U.S. Pat. 3,214,397, Oct. 26, 1965.

For some applications it is desirable for the foams to be isotropic, i.e. to have as nearly as possible the same compressive strength along each axis. This is particularly true where foams are used to fill voids as structural packing materials. Generally, in the past, low density foams of about 2 lb. per cubic foot have been anisotropic, with compressive strengths measured parallel to the direction of foam rise being greater than those measured in the perpendicular direction (i.e. the ratio of strengths is not equal to 1.0). This may be attributed to the elongation of the bubbles in the direction of foam rise and the natural tendency of the bubbles to rise as the liquid expands (Ferrigno, supra, page 89).

The use of nucleating agents in foam systems for the purpose of making fine cells is well-known. In polyurethane foams, for example, silicone oils have served as nucleating agents (Saunders and Frisch, supra, p. 240), but there has been no disclosure that the products were isotropic.

SUMMARY OF THE INVENTION

It has now been found that isotropic low-density polyurethane foams may be produced by using a preferred combination of polyolefin nucleating agent and volatile organic liquid blowing agent. We have found, by using polyethylene powder of less than 100 microns particle size as the nucleating agent and cyclopentane:acetone mixtures ranging in composition from 85:15 parts by volume of cyclopentane:acetone to 60:40 parts as the blowing agent, that excellent isotropic low-density foams are produced which were heretofore not obtainable.

Although the exact mechanism by which this effect is produced is not known with certainty, it is presumed to be related to the nucleating effect of the polyolefin particles. It is well-known that nucleating agents assist in the formation of bubbles much in the way a "boiling chip" insures a smooth, even distillation. For optimum effect in foaming, it appears that the particles should not be wet by the polyurethane mixture. They should be finely divided for greater efficiency per weight, preferably less than 100 microns in particle size. Furthermore, the particle should have approximately the same density as the polyurethane to insure that they remain suspended in the mixture during processing. Polyethylene powder serves admirably in all respects. Other polyolefins such as polypropylene are also useful. In general, polyolefins derived from olefins having 2 to 4 carbon atoms are preferred.

It is also presumed that the combination including cyclopentane-acetone mixtures as the blowing agent leads in some way to the fortuitous and unexpected result of isotropic strength properties. It may be suggested that the blowing agent is released from the polyurethane mixture in such a manner that the viscosity of the mixture is increased, thereby locking the initially spherical bubbles in place and preventing their elongation in the direction of foam rise. The peculiar combination of cyclopentane and acetone, together with the nucleating action of the polyethylene powder, gives the desired result.

In the present invention, the employment of polyethylene powder with cyclopentane-acetone has given excellent isotropic rigid closed-cell foams that were not obtained without the polyethylene. Further advantages of the present process over the prior art are the reduction in the reaction exotherm by the heat-sink effect of the foaming agent, thereby reducing or eliminating scorching; and the reduction of the viscosities of the reactant solutions by addition of cyclopentane-acetone mixtures, with attendant improvement in pumping and metering in commercial foaming machines.

The foams produced by this process are isotropic low-density substantially closed-cell rigid foams. Because of their structure and physical properties they are eminently useful for structural packing materials, e.g. in insulating spacecraft that are subjected to variable gravitational forces.

According to the present invention there is provided an improvement in the process of making a rigid substantially close-cell polyether-type polyurethane foam by the reaction of an aromatic polyisocyanate with a polyether polyol together with simultaneous foaming by action of a blowing agent, the improvement in which the foaming is done in the presence of a polyolefin powder as a nucleating agent, and the blowing agent comprises a mixture of cyclopentane and acetone having a volume ratio for cyclopentane:acetone of between 85:15 and 60:40.

It is an object of the present invention to provide rigid polyurethane foams of controlled density less than 4 lb. per cubic foot. It is a further object to provide isotropic substantially closed-cell rigid low-density polyurethane foams.

Suitable aromatic polyisocyanates include tolylene 2,4- and tolylene 2,6-diisocyanates, m- and p-phenylene diisocyanates, chlorophenylene 2,4-diisocyanate, naphthalene 1,5-diisocyanate, diphenyl 4,4′-diisocyanate, and diphenyl ether diisocyanate. Mixtures of aromatic diisocyanates may be used.

Suitable polyether polyols include the hydroxyl-terminated reaction products of cyclic oxides, e.g., 1,2-alkylene oxides, with polyhydric compounds such as those described by A. W. Anderson, in U.S. Pat. 2,927,918 (to Dow Chemical Company) Mar. 8, 1960. The reaction products of propylene oxide and glycerine, sorbitol, sucrose or pentaerythritol are particularly useful. Mixtures may be used if desired.

The polyolefin powder may be polyethylene made by solvent precipitation of high pressure process polyethylene or may be the powder normally obtained directly from the Ziegler polymerization process. Likewise, it may be polypropylene or polybutylene, or, in general, any polyolefin derived from olefins having 2 to 4 carbon atoms. The particle size should preferably be less than 100 microns. The powder is used in an amount of from 0.01 to 10% by weight of the foam-forming polyurethane mixture, preferably 0.1 to 5%.

The cyclopentane-acetone mixtures are provided in a wide range of compositions boiling below 45° C., but the preferred compositions are those containing 70–85 parts of cyclopentane by volume per 30–15 parts of acetone by volume. They are generally used at a level of 6–9% by weight of the foam-forming mixture.

If desired there may be included in the polyurethane foam-forming reaction mixture a catalyst, for example, a tertiary amine such as triethylamine or 1,4-diazabicyclo (2, 2, 2) octane, a tin compound such as diacetoxydibutyltin or tin (II) octoate, or mixtures thereof.

There may also be included various additives, not herein claimed, such as surfactants, foam-stabilizing agents, dyes, pigments, fillers, plasticizers, flame-retardants, etc.

The relative quantities of diisocyanate and polyether polyol may be varied, but it is preferred that the stoichiometry be such that there is a slight excess of diisocyanate, as for example where the NCO/OH index is 1.02.

DESCRIPTION OF THE PREFERRED EMBODIMENTS

The invention is further illustrated by, but not limited to, the following examples.

EXAMPLE 1

This example illustrates the properties of polyurethane foam of 1.9 lb./cu. ft. density, prepared with and without polyethylene powder.

(I) Without polyethylene powder

There was first prepared a quasi-polymer, component "A," by reaction of a diisocyanate and a relatively small amount of polyol. To 144.2 grams of commercial tolylene diisocyanate consisting of a mixture of 2,4- and 2,6-isomers in a weight ratio of approximately 80:20, respectively (hereinafter designated as TD–80), there was added about 0.04 ml. of diacetoxydibutyltin as a catalyst and 31.6 grams of the branched polyether polyol prepared by the addition of propylene oxide to glycerol and having a molecular weight of 255 and a hydroxyl number of 660 hereinafter designated as CP–260. The reaction mixture was stirred and maintained below 50° C., approximately 45–50° C., until the reaction was complete. The viscosity of the freshly prepared prepolymer was 500 cps. at 25° C.

Component "B" containing the bulk of the polyether polyol was prepared from 60.0 grams of the propylene oxide adduct of sorbitol having a molecular weight of 700 and a hydroxyl number of 490, hereinafter designated as LS–490; 58.5 grams of CP–260; 4.5 grams of a foam stabilizer (e.g. "Selcon R–150" obtainable from Houdry Process and Chemical Company and described in their bulletin of May 1, 1964, as a low viscosity, all-organic polymeric compound having a specific gravity of 1.07 at 20/4° C. and a viscosity of 1700 cps. at 25° C.); and 13.5 grams of pneumatogen consisting of a 60:40 (by volume) mixtures of cyclopentane-acetone.

The components were mixed, using 174 grams of "A," 137 grams of "B," and 13.5 grams of additional cyclopentane-acetone pneumatogen in a high-speed impeller-type mixer (e.g. "Waring Blendor") and was immediately discharged into a cardboard box. The foam rise time was 10.4 min.; the exotherm was 85° C. The foam was cured at 75° C. overnight.

(II) With polyethylene powder

Component "A" was prepared by adding 95 grams of CP–260, slowly with stirring, to 505 grams of TD–80 and 0.1 gram of diacetoxydibutyltin, while the reaction temperature was controlled at 45–50° C. It was cooled and mixed with a pneumatogen consisting of 87 grams of a 70:30 (by volume) mixture of cyclopentane-acetone.

Component "B" was prepared by mixing together 405 grams of LS–490, 69 grams of CP–260, 17.3 grams of R–150, 5.7 grams of pneumatogen and 17.3 grams of polyethylene powder of average particle size of 10 microns (e.g. "Microthene FN–500," U.S.I. Chemicals as described in their bulletin of copyright 1964, Ptd–40–265, as being a low-density polyethylene, of melt index 22 g./10 min., 0.915 g./cc. density, spherical particle shape, and less than 20 microns average particle size).

Components "A" and "B" were mixed for 20 sec. in a high-speed impeller mixer and quickly poured into a cardboard mold. The foam rise time was 16.5 min.; the exotherm was 124° C. The foam was cured at 75° C. overnight.

The properties of Foams I and II above may be compared as follows:

| | I | II |
|---|---|---|
| Density, lb./cu. ft. | 1.9 | 1.9 |
| Compressive strength, lb./sq. in.: | | |
| Parallel to foam rise | 22.1 | 24.7 |
| Perpendicular to foam rise | 15.0 | 25.0 |
| Ratio of strengths | 1.48 | 1.01 |

EXAMPLE 2

This example illustrates the properties of polyurethane foam of 2.4 lb./cu. ft. density, prepared with and without polyethylene powder.

(I) Without polyethylene powder

Component "A" was prepared by combining 329 grams of each of "A–1" and "A–2." "A–1" was prepared as follows: to 263 grams of TD–80 and about 0.06 gram of diacetoxydibutyltin was slowly added 66 grams of CP–260 with continual stirring, maintaining the temperature at 45–50° C. "A–2" was prepared as follows: to 296 grams of commercial 4,4'-diphenylmethane diisocyanate (e.g. "Mulrathane M" obtainable from Mobay Chemical Company and described in their data sheet No. 01070A of Feb. 1, 1959, as essentially pure di-functional isocyanate (99% minimum p,p'-diphenylmethane diisocyanate)) previously melted and filtered was added 0.07 gram of diacetoxydibutyltin and 33 grams of CP–260 with stirring, maintaining the temperature at 55–60° C. After mixing "A–1" and "A–2," there was added 82 grams of pneumatogen consisting of a 70:30 (by volume) mixture of cyclopentane-acetone.

Compound "B" was prepared by mixing together 375 grams of LS–490, 64 grams of CP–260, 16 grams of R–150 and 5 grams of pneumatogen.

Components "A" and "B" were mixed for 20 sec. in a high-speed impeller mixer and quickly poured into a cardboard box. The foam rise time was 6 min.; the exotherm was 104° C. The foam was cured at 75° C. overnight.

(II) With polyethylene powder

Component "A" was prepared by adding 96 grams of CP–260, with continual stirring, to 328 grams of TD–80 and 0.06 ml. of diacetoxydibutyltin, maintaining the temperature at 45–50° C. Thereafter was added 219 grams of commercial 4,4'-diphenylmethane diisocyanate (e.g. "Multrathane M") previously melted and filtered. At this stage the viscosity of the prepolymer was 560 cps. at 25° C. It was combined with 79 grams of pneumatogen consisting of a 70:30 (by volume) mixture of cyclopentane-acetone.

Component "B" was prepared by mixing together 375 grams of LS–490, 64 grams of CP–260, 16 grams of R–150, 5.4 grams of pneumatogen and 16 grams of polyethylene powder having an average particle size of 30 microns.

Components "A" and "B" were mixed for 20 sec. in a high-speed impeller mixer and quickly poured into a cardboard box. The foam rise time was 15 min.; the exotherm was 113° C. The foam was cured at 75° C. overnight.

The properties of Foams I and II above may be compared as follows:

|  | I | II |
|---|---|---|
| Density, lb./cu. ft | 2.4 | 2.4 |
| Compressive strength, lb./sq. in.: | | |
| Parallel to foam rise | 22.5 | 29.8 |
| Perpendicular to foam rise | 15.0 | 27.2 |
| Ratio of strengths | 1.50 | 1.09 |

It is to be understood that although the invention has been described with specific reference to particular embodiments thereof, it is not to be so limited since changes and alterations therein may be made which are within the full intended scope of this invention as defined by the appended claims.

What we claim is:

1. In the process of making a rigid substantially closed-cell polyether polyurethane foam by the reaction of an aromatic polyisocyanate with a polyether polyol together with simultaneous foaming by action of a blowing agent, the improvement in which the foaming is done in the presence of a polyethylene powder having a melt index of about 22 g./10 min., a density of about 0.915 g./cc., and less than 20 microns average particle size as a nucleating agent, said nucleating agent being used in an amount of from 0.01 to 10.0% by weight of the foam-forming polyurethane mixture, and the blowing agent comprises a mixture of cyclopentane and acetone having a volume ratio for cyclopentane:acetone of between 85:15 and 60:40.

2. The process of claim 1 in which the aromatic polyisocyanate is selected from the group consisting of 2,4-tolylene diisocyanate, 2,6-tolylene diisocyanate, and 4,4'-diphenylmethane diisocyanate.

3. The process of claim 1 in which the polyether polyol is the reaction product of propylene oxide with a member selected from the group consisting of glycerine and sorbitol.

4. The process of claim 1 in which the mixture of cyclopentane and acetone contains 70 parts of cyclopentane to 30 parts of acetone by volume.

5. The product consisting of a rigid substantially closed-cell polyether polyurethane foam obtained by the process of claim 1.

References Cited

UNITED STATES PATENTS

| 2,591,884 | 4/1952 | Simon et al. | 260—2.5 |
| 2,642,920 | 6/1953 | Simon et al. | 154—2.6 |
| 3,194,773 | 7/1965 | Hostettler | 260—2.5 |
| 3,310,604 | 3/1967 | Steingiser et al. | 260—859 |

FOREIGN PATENTS

| 707,381 | 4/1965 | Canada | 260—2.5 |
| 860,109 | 12/1952 | German Patenschrift | 260—2.5 |
| 1,075,964 | 4/1954 | France | 260—2.5 |
| 1,156,783 | 7/1969 | Great Britain | 260—2.5 |

OTHER REFERENCES

Saunders et al., Polyurethanes, Part II, p. 286 (1964).
Encyclopedia of Polymer Science and Technology, pp. 532–534 (1966).

DONALD E. CZAJA, Primary Examiner

C. W. IVY, Assistant Examiner